United States Patent
Ramesh et al.

(10) Patent No.: US 10,282,904 B1
(45) Date of Patent: May 7, 2019

(54) PROVIDING AUGMENTED REALITY VIEW OF OBJECTS

(75) Inventors: Sunil Ramesh, San Jose, CA (US); Matthew Warren Amacker, Santa Clara, CA (US); Max Delgadillo, Jr., Santa Clara, CA (US); Keshav Menon, Sunnyvale, CA (US); Ella Day Bench, Seattle, WA (US); Arnab S. Dhua, Mountain View, CA (US); Gautam Bhargava, Palo Alto, CA (US)

(73) Assignee: A9.Com, Inc., Palo Alto, CA (US)

( * ) Notice: Subject to any disclaimer, the term of this patent is extended or adjusted under 35 U.S.C. 154(b) by 133 days.

(21) Appl. No.: 13/485,152

(22) Filed: May 31, 2012

(51) Int. Cl.
*G06F 3/01* (2006.01)
*G06T 19/00* (2011.01)
*G06T 11/60* (2006.01)

(52) U.S. Cl.
CPC ............ *G06T 19/006* (2013.01); *G06F 3/015* (2013.01); *G06T 11/60* (2013.01)

(58) Field of Classification Search
CPC ..... G06F 15/16; G06Q 30/00; G06K 17/0016
See application file for complete search history.

(56) References Cited

U.S. PATENT DOCUMENTS

| | | | | |
|---|---|---|---|---|
| 2010/0082447 A1* | 4/2010 | Lin | ........................ | G06Q 30/02 705/26.1 |
| 2010/0082821 A1* | 4/2010 | Rosenblatt et al. | .......... | 709/228 |
| 2010/0174599 A1* | 7/2010 | Rosenblatt et al. | ....... | 705/14.37 |
| 2011/0055049 A1* | 3/2011 | Harper | .................... | G06F 3/011 705/27.1 |
| 2011/0131241 A1* | 6/2011 | Petrou | ............... | G06F 17/30861 707/770 |
| 2012/0113141 A1* | 5/2012 | Zimmerman | ...... | G06Q 30/0643 345/633 |
| 2012/0173347 A1* | 7/2012 | De Almeida Neves et al. | ............ | 705/16 |
| 2012/0209749 A1* | 8/2012 | Hammad et al. | ............ | 705/27.1 |
| 2012/0218444 A1* | 8/2012 | Stach | ............................ | 348/241 |
| 2013/0147970 A1* | 6/2013 | Herring et al. | ............. | 348/207.1 |
| 2013/0240617 A1* | 9/2013 | Ramsey | ............ | G06F 17/30265 235/375 |

OTHER PUBLICATIONS

Roy Want, "iPhone Smarter Than the Average Phone" Pervasive Computing, 2010, IEEE (Year: 2010).*
Eisaku et al. "Barcode Readers using the Camera Device in Mobile Phones", 2004, IEEE (Year: 2004).*

* cited by examiner

*Primary Examiner* — Aaron M Richer
*Assistant Examiner* — Khoa Vu
(74) *Attorney, Agent, or Firm* — Hogan Lovells US LLP

(57) ABSTRACT

A user can capture image information about an object in order to identify the object. In addition to obtaining information about the object, the user can obtain additional views of the object. For example, if the user captures an image of packaging containing the object, the user can receive views of the object when out of the packaging, as well as a view showing the relative size of the object within the packaging. If the object requires assembly, the views can include views of the object at the component, part, or ingredient level, as well as views during assembly and one or more views of the finished product. A user also can obtain a virtual x-ray view that enables the user to move the client device with respect to the object in order to obtain different views of what is contained within the packaging.

27 Claims, 6 Drawing Sheets

PROVIDING AUGMENTED REALITY VIEW OF OBJECTS

BACKGROUND

Users are increasingly utilizing electronic devices to obtain various types of information. For example, a user wanting to obtain information about an object of interest can capture an image of the object and cause that image to be analyzed to attempt to locate information for a matching object. Such approaches are generally limited, however, as the located information often includes only images provided by a manufacturer or provider of the object, which might already be included on a packaging of the item. If the object is concealed in packaging, the user either has to open the packaging (which might not be allowed in a retail or other such setting) or wait and search for images of that type of item using a search engine or other such tool. Oftentimes, a user wants the information when the user is in a store or other location where the user needs to make a decision about the object, and waiting until the user gets home to obtain those images often results in the user no longer being interested in those views.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure can overcome one or more of the above-referenced and other deficiencies in conventional approaches to identifying various types of objects using an electronic device. In particular, various embodiments enable a user to obtain different views of an object of interest in response to the user providing information about that object. In at least some embodiments, a user can capture an image (or video) of an object using a camera of a portable computing device. The user can upload information for the image to a matching service configured to identify the object, and provide the user with information about that object, such as a description, pricing and availability, and other such information. In some instances, the image the user provides will include packaging for the object, and not an image of the object itself. In other embodiments, a user might provide an image of an object, or parts of an object, outside the original packaging. In addition to providing the user information about the object, the user in such a situation can be provided with one or more alternate views of the object, such as may show the object outside the packaging, inside the packaging, a view of the packaging itself, a view of the parts that are included inside the packaging, a relative size of the object to the packaging, a final product made with the packaging, or other such views. In at least some embodiments, the alternate views can also show an object in a physical state other than a current state of the object, such as a state where the object is assembled, partially assembled, prepared, taken apart, etc.

Various other functions and advantages are described and suggested below as may be provided in accordance with the various embodiments.

Figure 1:
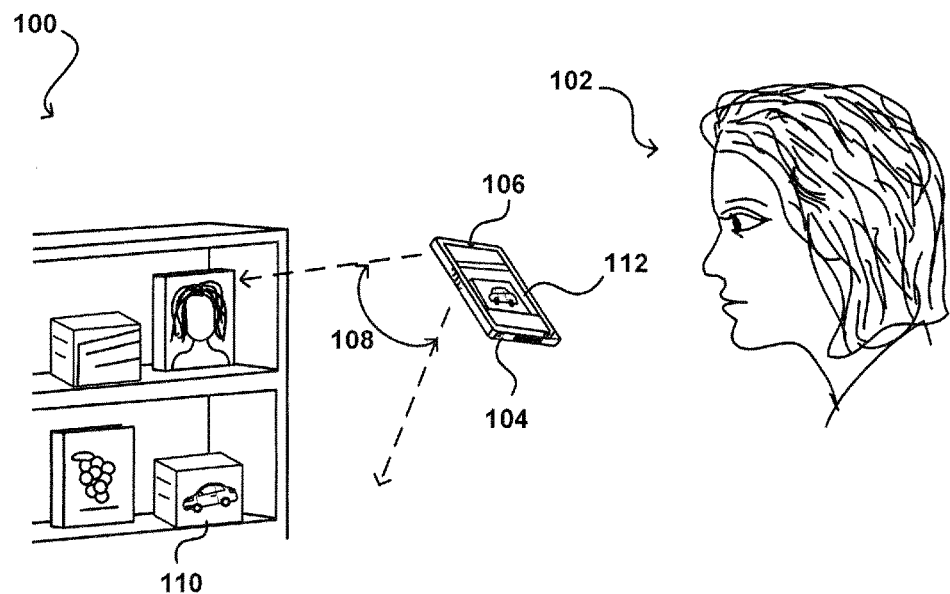
FIG. 1 illustrates an example environment n which aspects of the various embodiments can be that can be utilized.

FIG. 1 illustrates an example environment 100 in which aspects of the various embodiments can be implemented. In this example, a user 102 is in a store that sells items, such as books, toys, and the like, and is interested in obtaining information about an object 110 of interest. In this example, the object 110 is a model car kit, still in the box. Using an appropriate application executing on a computing device 104, the user is able to obtain an image of the object 110 by positioning the computing device such that the object is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among other such devices.

In this example, a camera 106 on the device 104 captures image information (e.g., still or video) including the object 110 of interest, and at least a portion of the image is displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the object on the screen, drawing a bounding box around the object, or centering the object in the field of view. In other embodiments, one or more image analysis algorithms can attempt to locate one or more objects in an image to be analyzed. In some embodiments, a user can manually cause image information to be analyzed, while in other embodiments the image information can be analyzed automatically, either on the device or by streaming scene data to a remote system or service as discussed later herein.

Figure 2:
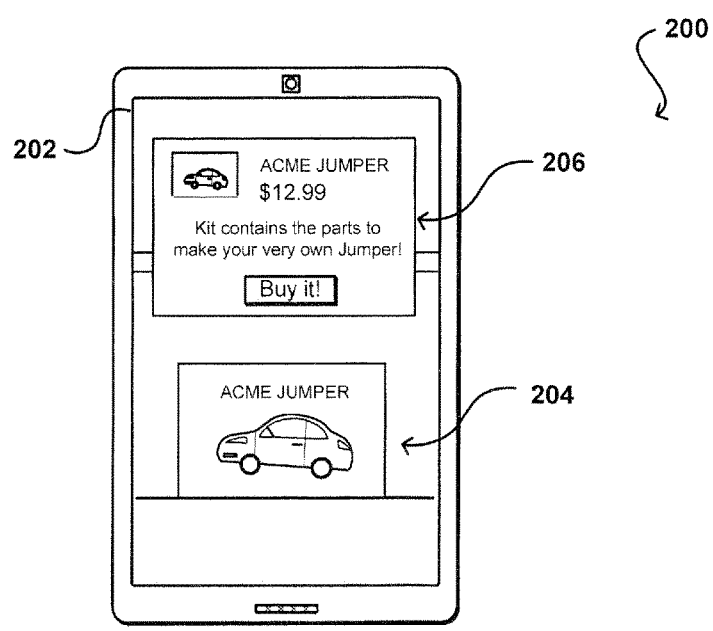
FIG. 2 illustrates an example display that can be presented in accordance with various embodiments.

FIG. 2 illustrates an example of a type of information 206 that could be displayed to the user via a display screen 202 of a computing device 200 in accordance with various embodiments. In this example, captured image information (e.g., video) is displayed on the display screen 202. In at least some embodiments video can be shown on the display screen in near real time, including after one or more frames or portions of that video has been provided or selected for analysis. In addition to the image or video information, related information 206 that has been located for the object can be displayed as well. The related information in this example includes an image of the identified object, such that the user can verify the identified object corresponds to the object of interest. The related information in this example also includes a title or name of the object (or type of object), pricing information, a description, and an option to purchase at least one of that type of object. It should be understood that while various examples discussed herein relate to products offered for consumption (e.g., purchase, rent, or lease), various other types of objects and information can be utilized as well within the scope of the various embodiments.

The "related" information as discussed elsewhere herein can include any information related to an object, item, product, or other element that is matched (within at least a level of confidence) to the image data using one or more matching or identifying algorithms, or other such approaches. These can include, for example, image recognition algorithms, feature recognition algorithms, facial recognition algorithms, audio pattern recognition algorithms, or any other such approaches or techniques. In some embodiments, the type of information displayed (or otherwise conveyed) can depend at least in part upon the type of object located or matched. For example, a located product might include pricing and availability information, while a located place might contain address data. For facial recognition, the information might include name, title, and contact information. Various other types of information can be displayed as well within the scope of the various embodiments.

When locating related information for an object, a matching service or other such entity can attempt to determine a type of the object, as mentioned above. The type of object can be used to determine not only the type of information to be conveyed, but also whether or not to provide alternate views of the object. For example, in the example of FIG. 2 the user is looking at a model kit that is still in the box. Assuming the user is in a store or other such location, the user is unable to open the box to see what is inside. The user might want to determine various information about the contents of the box, such as the number of parts, a coloring of the parts to know which parts will need painting, the type of instruction booklet contained in the packaging, or other such information. The user might also want to determine what the model will look like when it is finished, which other options or looks can be used with that model kit, and how big the actual car will be with respect to the box. Various other types of information might be of interest to the user as well.

Systems and methods in accordance with various embodiments can enable a user to obtain various alternate views for objects, providing the user with these and other types of additional information about that object. The types of views available, number of views available, and other such information can depend at least in part upon a type of the object. For example, a bouncing ball that does not come in any packaging or have different forms might not include any alternate views, or might only provide the default views provided by the manufacturer. An object such as a model kit, build it yourself furniture, or a "meal in a box," however, might have additional views that provide useful information to the user. As discussed, such objects often come in packaging that prevents the user from seeing what is in the packaging, or at least being able to access the contents inside the packaging. In at least some embodiments, information for such objects can be flagged, can include metadata, or can otherwise be designated as corresponding to a type of object where alternate views might be desirable. Such determinations can be made in any appropriate way, such as through human interaction, automatically based on category or metadata, or another such approach. In some embodiments no such determination or categorization might be made, but there might instead be alternate views associated with information for an object, such that an application or device can dynamically determine whether alternate views are available. Various other approaches can be used as well within the scope of the various embodiments.

FIG. 3(*a*) illustrates an example situation 300 wherein a user has captured image information of a model car kit, and an image 302 or video of the imaged kit is displayed on the computing device. The image can have been analyzed on the device, or remotely, and related information located for the object. At least a portion of the related information 304, such as an image of the kit packaging and a name of the kit, can be displayed on the display screen with the captured image of the kit. In this example, however, one or more alternate views have been located for that type of object. Various types of navigational approaches can be used to enable the user to access those views, such as a scroll bar, arrows, selectable icons, and the like. In this example, at least a portion of the views are categorized based at least in part upon the type of view. In this particular example, a view is available that shows what is contained inside the packaging. An option 306 therefore is provided that enables the user to "look inside" the packaging, or obtain a view of the contents of the packaging.

FIG. 3(*b*) illustrates an example situation 320 resulting from a user selecting an option such as described with respect to FIG. 3(*a*). In this example, a second view of the object is displayed showing a view 322 of the contents of the packaging. The contents for the model kit include a view of the individual pieces before assembly, which can provide the user with information such as the number of pieces, relative complexity of the kit, coloring of the pieces, and other such information. In some embodiments, the user can zoom in on the view, select specific portions of the view for analysis, or otherwise attempt to extract information from the view. In some embodiments, additional related information can be provided with the view, which in this case could include a description of the number of pieces, complexity, estimated assembly time, or other such information. There also can be additional views of the inside components, which the user can navigate to using one of the approaches discussed or suggested herein.

In this example, there are other views of the object available, as is evidenced by the "Look Outside" option in FIG. 3(*b*). Upon a user selecting such an option, using any appropriate type of selection input, another view 342 can be presented, such as is illustrated in FIG. 3(*c*). In this example, the view 342 presents an image of the model kit after assembly. As mentioned, this can be an image provided by a manufacturer or retailer of the product, or an image provided by another person who has assembled the kit, among other such options. In some embodiments, a user might be able to scroll or navigate through different versions of that view in order to see how different users have assembled the kit, including different paint jobs, customized accessories, or other such options. In some embodiments the view can also present multiple angles, such as front, side, top, etc. In some embodiments, the view might not be a still image at all, but might be a three-dimensional model or Flash® content that can enable the user to obtain different angles of view. In some embodiments one or more views might be interactive, such as where a user can activate a light shown in a view, cause a color or zoom level of a current view to change, play with a virtual version of the object, etc. An alternate view can also be an enhanced view, whereby a user can obtain information and/or pointers to specific aspects of the object in that particular view. Similarly, the view might instead include video or animation showing different angles of the object. In some embodiments, an image might be displayed with an icon to show video of the object after completion. In some embodiments, the video might also show an assembly process, either sped up or in stop motion, for example, or can show the model car rolling through different situations, among other such options.

Figure 3A:
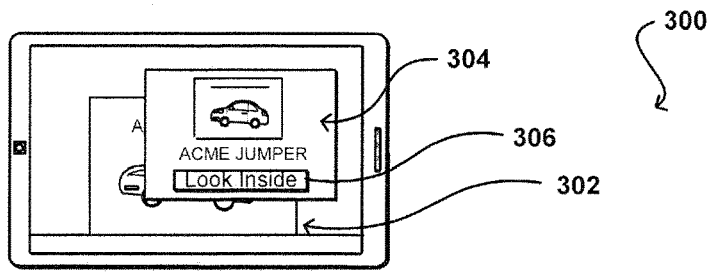
FIGS. 3(a), 3(b), 3(c), and 3(d) illustrate example views of an item that can be presented in accordance with various embodiments.
Figure 3B:
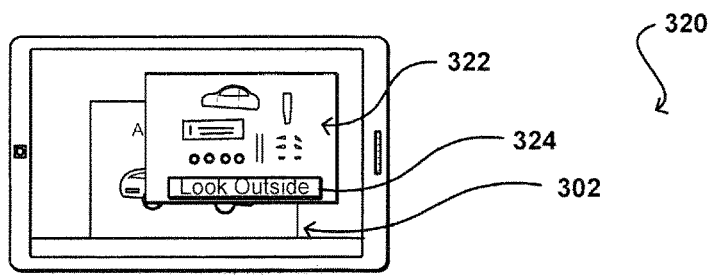
Figure 3C:
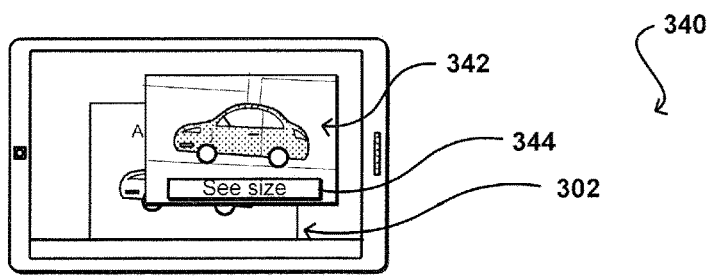
Figure 3D:
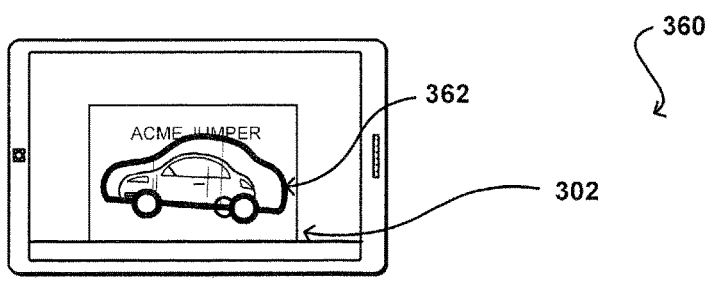

In addition to various image views, the user might also want to obtain a view from which the user can determine the relative size of the object after assembly. Accordingly, if image information is available that comes with scale information, the user can be presented with an option 344 to see a view that provides an indication of the size of the object. As illustrated in FIG. 3(d), the device can display an outline 362, translucent image, or other view of the object that can be overlaid on top of the view of the packaging 302. If the size of the box can be determined (e.g., by using stereoscopic imaging) or the relative size of the object to the packaging is known, the device can adjust a scale of the outline 362 or other such representation such that the outline corresponds to the actual size of the object with respect to the packaging. Thus, as a user moves the device towards, or away from, the packaging, the size of the outline can adjust, which gives the effect of the user being able to see "inside" the packaging. Such scale options can be used with the component view or other such views as well. In embodiments where three-dimensional modeling information is available, the user can move the device around the box and/or rotate the box with respect to the device, and can see a rotating view of the object inside the box as well.

Figure 4A:
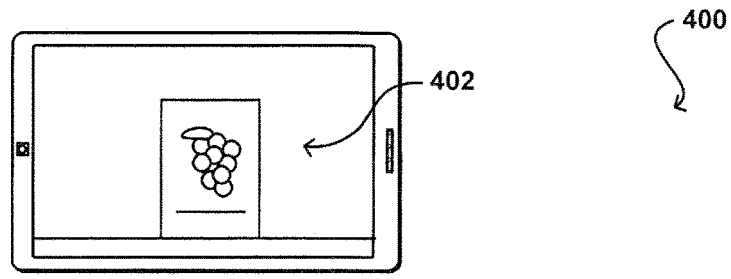
FIGS. 4(a) and 4(h) illustrate example views of an item that can be presented in accordance with various embodiments.
Figure 4B:
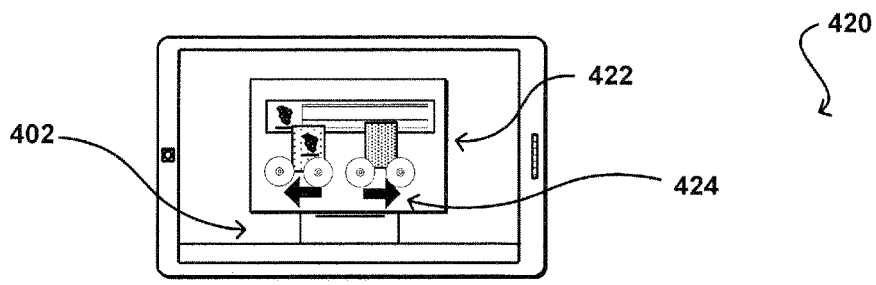

FIG. 4(a) illustrates another example situation 400 where a user is capturing image information for an object 402 of interest, where the object is contained in packaging but no assembly is required. In this example, the object is a compact disc box set for one of the user's favorite musical artists. Since there is no assembly required, there may not be component and assembled views as with the model kit discussed above. There can still be an option, however, to view the contents inside the box. For example, as illustrated in the situation 420 of FIG. 4(b), a an alternate view 422 when displayed can show the contents of the box set, such as a view showing the number of discs included, any booklets or posters, any inside art on the box itself, and other such information. A user is thus able to determine the contents of the box without being able to open the box. Other views can be accessed as well, such as by selecting one or more navigational elements 424 displayed on the screen. A user can thus scroll through the different views to obtain the desired information.

In some embodiments, the various available views can be ranked using one or more ranking algorithms. When a user accesses the alternate view, a top ranked view might be shown first, with the user able to navigate to the other views in descending order. The ranking can be performed for the object, the type of object, the specific user, or any other such criteria. For example, if the object is a box including a piece of furniture to be assembled, a monitoring service might determine that most users want to see a view of what the piece looks like when assembled, followed by a view of the pieces contained in the box. Thus, the ranking algorithm might present the assembled view first when alternate views are accessed by a user. In other embodiments, the device might utilize user-specific information. For example, if the user always wants to see the contents inside the package but rarely cares about video showing the final or assembled object being used, then the contents page might be ranked highly for that user, with the video being ranked much lower, if even presented to the user at all. In some embodiments, a weighted combination of factors can be used to determine an ordering or ranking of content to show to the user. Various approaches to ranking content based on user preferences or behaviors are known in the art, and at least some of these can be applied to various embodiments as should be apparent to one of ordinary skill in the art in light of the teachings and suggestions contained herein.

A user also can use a layered or three-dimensional view to view different portions of the content of the object. In this example, when the user gets within a determined distance (or otherwise provides input to the device) the view can change from a view of the outside of the box set packaging to a view of the first layer of content inside the box. For example, a first view might show the art on the inside front cover of the box. As the user moves the device closer to the box, as may be determined using a motion sensor of the device or by monitoring the size of the object in the field of view, a next view can be displayed that shows a booklet positioned adjacent the front cover, then a next view showing cover art of the first disc, the next view showing cover art of the second disc, and so on. A user thus can control the view, and can get a virtual x-ray type view into the packaging to obtain different views of different portions of the contents inside the packaging.

Figure 5A:
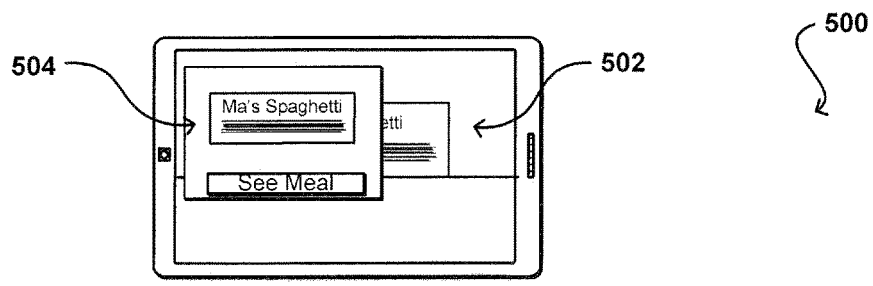
FIGS. 5(a) and 5(b) illustrate example views of an item that can be presented in accordance with various embodiments.
Figure 5B:
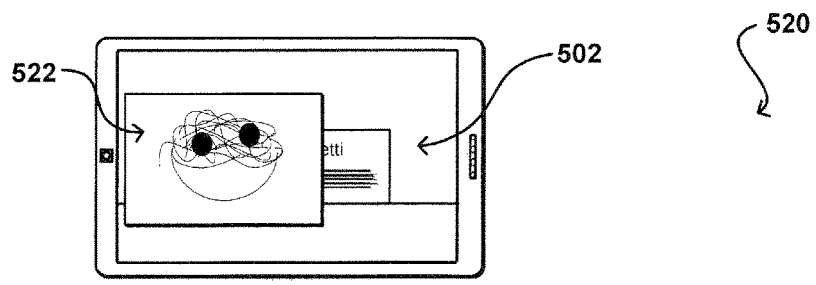

In some embodiments, the user may not care very much about the view of the contents inside the packaging, but might be interested in what can be done with the contents. For example, FIG. 5(a) illustrates an example situation 500 wherein a user has captured an image of a box of spaghetti 502, and related information 504 has been located and displayed to the user. In many instances a user will not care what the uncooked spaghetti looks like inside the box, although such a view still might be made available in at least some embodiments. In this example, the user is more interested in a view of a dish or meal made with that ingredient. FIG. 5(b) illustrates an example situation 520 wherein a user has selected an option to see a meal made with the contents. An alternate view 522 presented in this example provides a view of a prepared dish of spaghetti and meatballs. In at least some embodiments, the related information for the view can be recipe and/or related ingredient information, which the user can save, download, or otherwise utilize in order to make the dish using that ingredient. In some embodiments the user can scroll through views of other dishes that can be prepared using the ingredient, and in some embodiments can select a recipe and have the ingredients for that recipe added to a virtual shopping cart. Various other options can be provided as well within the scope of the various embodiments.

Figure 6:
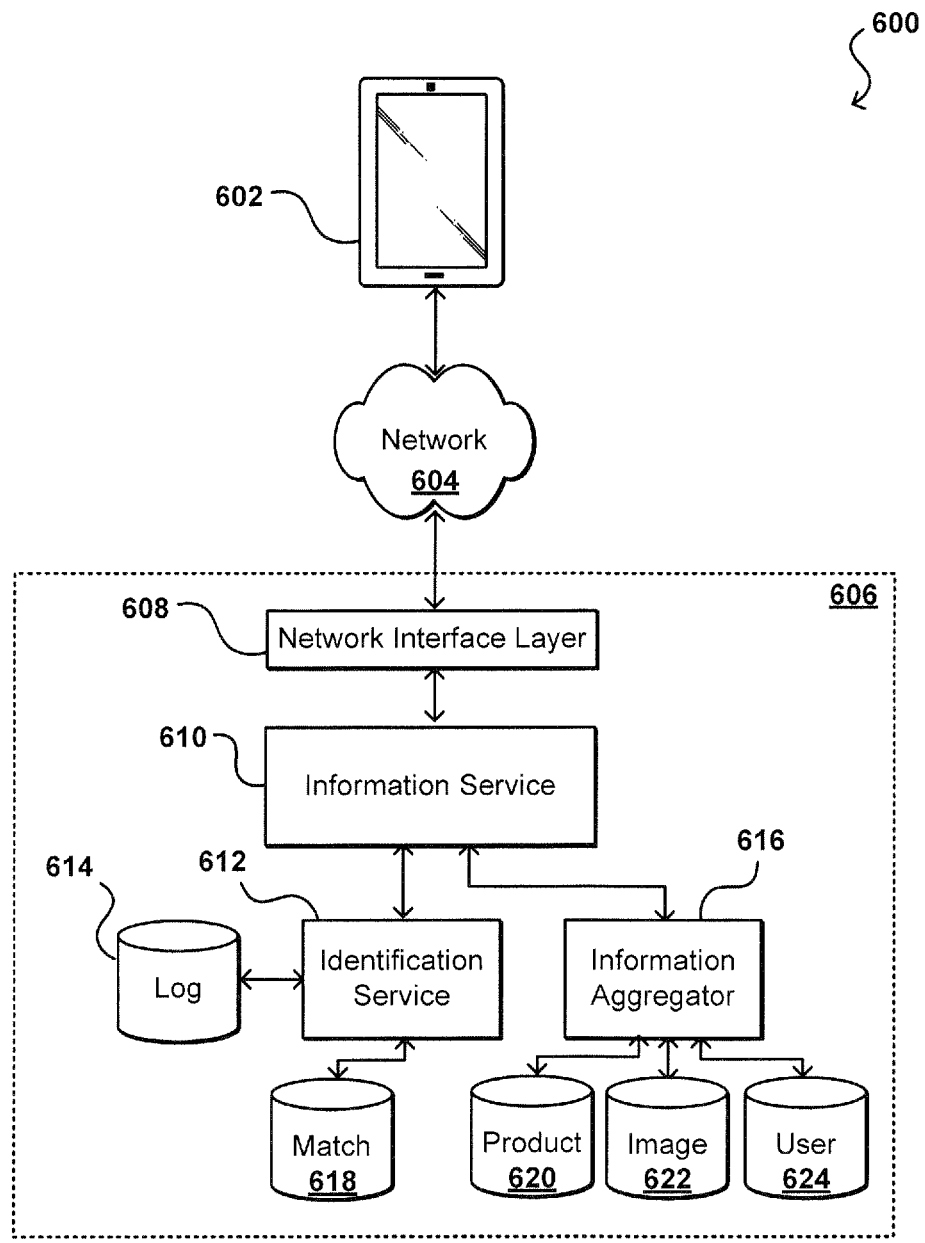
FIG. 6 illustrates an example system for providing views of an object that can be presented in accordance with various embodiments.

Object identification, related information, alternative views, and other such information can be obtained and/or provided by uploading, streaming, or otherwise transferring an image, audio clip, a video segment, and/or other electronic data to a system or service operable to find one or more potential matches for that data and provide related information for those potential matches. In some embodiments, at least a portion of the processing or pre-processing of the data can be performed on the device before transfer, as known in the art for image matching and other such purposes. FIG. 6 illustrates an example environment 600 in which such information can be located and transferred in accordance with various embodiments. In this example, a user is able to capture image information using at least one computing device 602. For example, a user can cause a device to capture image and/or video information around the device, and can send at least a portion of that information across at least one appropriate network 604 to attempt to obtain information for one or more objects within a detectable vicinity of the device. In some embodiments, a user can also indicate images of an object not obtained by the user, or can provide information that can otherwise be used to identify an object. The network 604 can be any appropriate network, such as may include the Internet, a local area network (LAN), a cellular network, and the like. The request can be sent to an appropriate content provider 606, as may provide one or more services, systems, or applications for processing such requests. The information can be sent by streaming or otherwise transmitting data as soon as it is obtained and/or ready for transmission, such as for video data, or can be sent in specific communications.

In this example, the request is received to a network interface layer 608 of the content provider system 606. The network interface layer can include any appropriate components known or used to receive requests from across a network, such as may include one or more application programming interfaces (APIs) or other such interfaces for receiving such requests. The network interface layer 608 might be owned and operated by the provider, or leveraged by the provider as part of a shared resource or "cloud" offering. The network interface layer can receive and analyze the request, and cause at least a portion of the information in the request to be directed to an appropriate system or service, such as an information service 610. An information service in this example includes components operable to receive electronic data about an object, analyze the data using business logic, and return information relating to that object, or related objects. For example, an information service can receive information including one or more images of an object near a device, and can cause information to be sent to at least one identification service 612 or system that is operable to attempt to match information for the image data. Various other services, and combinations of services, can be utilized as well within the scope of different embodiments. In at least some embodiments, an identification service 612 will process the received data, such as to extract points of interest or unique features in a captured image, for example, then compare the processed data against data stored in a matching data store 618 or other such location. The data in the matching data store might be indexed and/or processed to facilitate with matching, as known for such purposes. For example, the data store might include information for unique features in an image instead of a copy of the image itself, which can increase the speed and lower the processing requirements of the matching.

The information service 610 can receive information from each contacted identification service 612 as to whether one or more matches could be found, and can receive any appropriate information for a located potential match. The information from each identification service can be analyzed and/or processed by one or more applications of the information service, such as to determine data useful in obtaining information for each of the potential matches to provide to the user. For example, an environmental information service might receive bar codes, product identifiers, or any other types of data from the identification service(s), and might process that data to be provided to a service such as an information aggregator service 616 that is capable of locating descriptions, alternate views, or other content related to the located potential matches.

In at least some embodiments, an information aggregator service might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of elements or information as discussed and suggested elsewhere herein. In such an instance, the information aggregator service 616 can utilize the aggregated data from the information service 610 to attempt to locate products, in a product data store 620 or other such location, which are offered through the marketplace and that match, or are otherwise related to, the matching objects. As an example, if the identification service identifies a puzzle in the captured image or video data, the information aggregator can attempt to determine whether that puzzle is offered through the marketplace, and can obtain data from the marketplace relating to the item. The identification service can also determine whether there are any alternate views of that puzzle stored in an image data store 622, as well as a context of at least some of those views, for presentation to the user. In at least some embodiments, the information aggregator can utilize one or more suggestion algorithms or other such approaches to attempt to suggest related items and/or views to display to the user. For example, if the object is an ingredient a suggestion algorithm might be used to determine dishes or recipes to suggest to the user, as may be based on overall popularity, past user purchases or selections as stored in a user data store 624, or other such information. In some embodiments, the information aggregator can also return other types of data (or metadata) to the information service as well, as may include title information, availability, reviews, and the like. Various other types of information can be returned as well within the scope of the various embodiments.

The information service 610 can bundle at least a portion of the information and/or alternate views together to send to the client as part of one or more messages or responses to the original request. Information for the matching objects located by the various identification services can be written to a log data store 614 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 606 in FIG. 6, one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user.

Figure 7A:
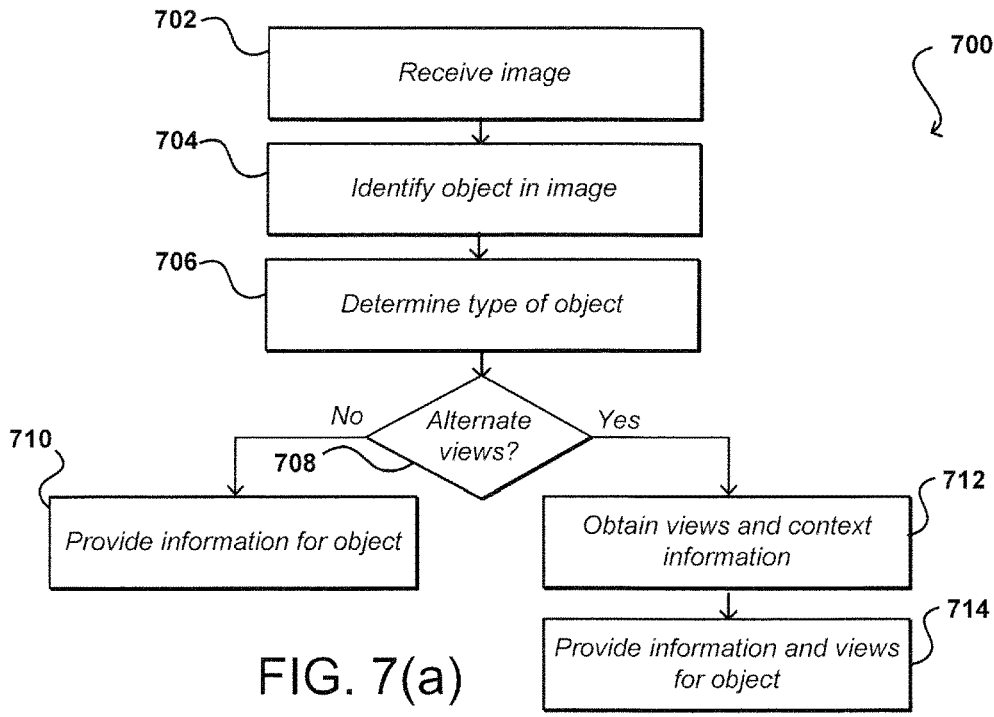
FIGS. 7(a) and 7(b) illustrate portions of an example process for determining alternative views of an identified object that can be presented in accordance with various embodiments.
Figure 7B:
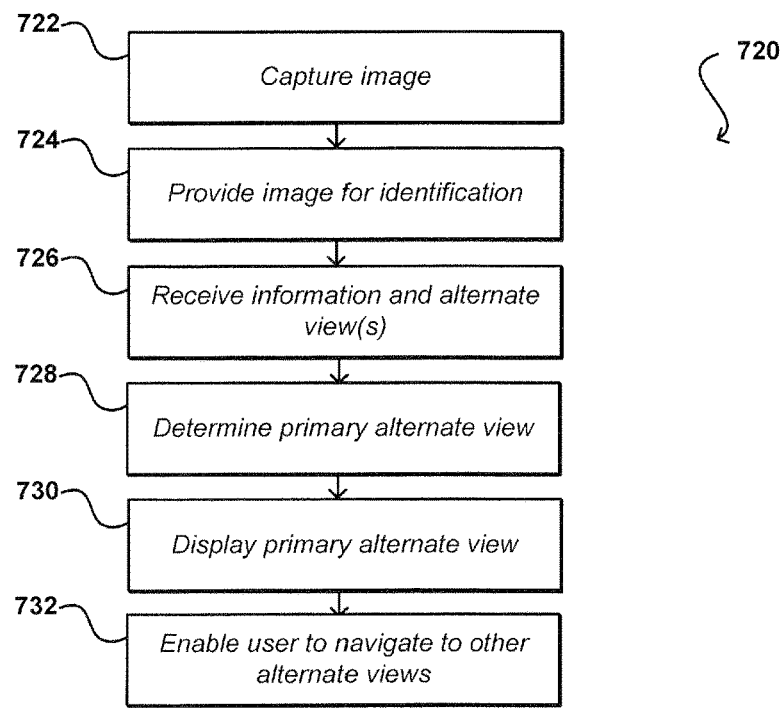

FIGS. 7(a) and 7(b) illustrate portions 700, 720 of an example process for identifying an object and providing one or more alternate views that can be utilized in accordance with various embodiments. It should be understood that there can be additional, fewer, or alternative steps performed in similar or alternative orders, or in parallel, within the scope of the various embodiments unless otherwise stated. FIG. 7(a) represents a portion 700 of the process performed by a matching service or other such entity. In this example, an image is received 702 from a client device. The image can be an image that was captured by the device, or otherwise obtained or indicated by a user of the client device. An object in the image can be identified 704 using any appropriate image matching and/or object identification approach discussed or suggested herein, or otherwise utilized for such purposes. A determination of the type of object can be made 706, which can be used to determine whether alternate views are appropriate for the object. A determination then can be made 708 as to whether alternate views are available for the object when appropriate. If not, information for the identified object can be provided 710 to the client device. If one or more alternate views are available, those views and any contextual information for those views can be obtained 712, such as by contacting an image service or other such entity. One or more of the alternate views then can be sent 714 with the information for the identified object to the client device for presentation to the user.

FIG. 7(b) represents a portion 720 of the example process performed at a client device. An image is captured 722 or otherwise obtained by the client device, and provided 724 to an image matching or object identification service. As discussed, at least some pre-processing might be done on the image, such as to convert the image to a grayscale image, extract feature points or a histogram vector, etc. In some embodiments, all matching and object identification might be done on the client device as well, or at least an attempt made to identify the item using information available to the device, after which the information might be transmitted to a service for assistance with the identification. In response to sending the image information, information for an identified object and one or more alternate views can be received 726 by the client device. The device can determine 728 a primary or initial alternate view to display, such as may be based on historical data, user preference data, or other such information as discussed elsewhere herein. The client device can then display 730 the primary alternate view on a display element of the device. The device can also enable 732 a user to navigate to other alternate views when available, such as by scrolling to, or otherwise requesting, additional views. As discussed, one or more ranking algorithms can be used to rank and/or select views to be presented to the user. Various other approaches can be utilized as well within the scope of the various embodiments.

As discussed, such approaches can be beneficial for any type of object that is contained or concealed within some sort of packaging, particularly where the appearance is significantly different when packaged versus when out of the package. For example, users might want to know what a set of toy blocks looks like when assembled, as well as what the blocks look like when they are not assembled. A user might want to know what a piece of furniture looks like when assembled, as well as that the unassembled pieces in a box look like. For each of these examples, the user might also like to see images of various stages of assembly of the objects. For seeds, plants, or other home and garden type objects, the user might want to see what the final object looks like, what the object looks like in various stages of growth, etc. The user might also want to see images of the required planting or maintenance. For box sets, or other packages that contain multiple items, the user might want to obtain one or more views of the contents of the packaging. For food ingredients, craft supplies, or other such items, the user might want to see the types of things that can be made with those objects, as well as views of those results being produced. For clothing items or shoes, a user might want to see a video of a person wearing and/or moving in those items, in order to get a better sense of how the items will work once outside the packaging. For objects such as curtains or linens, the user might want to see what the objects look like when used for their intended purposes, and see potential decorating options that utilize those objects. Various other views can be provided as well within the scope of the various embodiments.

In at least some embodiments, the alternate views can be provided as a service to third party providers. For example, a user might be interested in an object offered by a content provider. In order to provide alternate views for the user, the content provider might contact a service with information that can be used to identify an object, in order to obtain alternate views to provide to the user. In some embodiments, the content provider can specify a specific type of view to be provided, if available. Usage statistics can be collected for each provider, in order to rank and/or select views that are most appropriate for users of that provider.

In some embodiments, a process can attempt to obtain additional views from third party sources. For example, if a content provider does not have a view of a model kit after assembly, the content provider can contact a third party or even perform an image search to attempt to locate such a view. In some embodiments, a provider might even contact customers who have purchased the model kit and ask them to provide an image showing the completed kit. The providing can be done at any appropriate time in order to obtain additional alternate views for one or more objects, or can be performed in response to a specific request for a particular view.

At least some embodiments do not need to perform an image match on the packaging of the object. For example, a barcode might be contained on the packaging and sufficient to identify the object. Similarly, an OCR process or other such process can be used to identify the object, such that alternate views and other information can be obtained. Other approaches can be used as well, such as a user identifying an object, performing a search for a specific object, etc.

In some embodiments a window or panel providing alternate views can include a scroll bar or other navigation option that enables a user to navigate to a specific type of alternate view. For example, if the exterior view the user is looking for is the tenth alternate view in order, the user can select to move directly to that particular view instead of having to maneuver through the previous nine images, videos, animations, or other such alternate content. As discussed, a video might have an icon or thumbnail displayed initially that the user has to select in order to stream or otherwise play the video, such that the client device does not have to download the video if the user is not interested in viewing the video.

Such approaches can also allow a user to get a closer view of certain objects. For example, if a store is closed but a user can see an object of interest through a store window, the user can cause a device to capture image information of the object and obtain views of that object, as well as description and other related information.

Further, a user does not need to use a touch screen to maneuver through the various alternate views. A user can provide various other types of input as well, such as may include voice input, motion input, gesture input, and device movement, among other such options.

Figure 8:
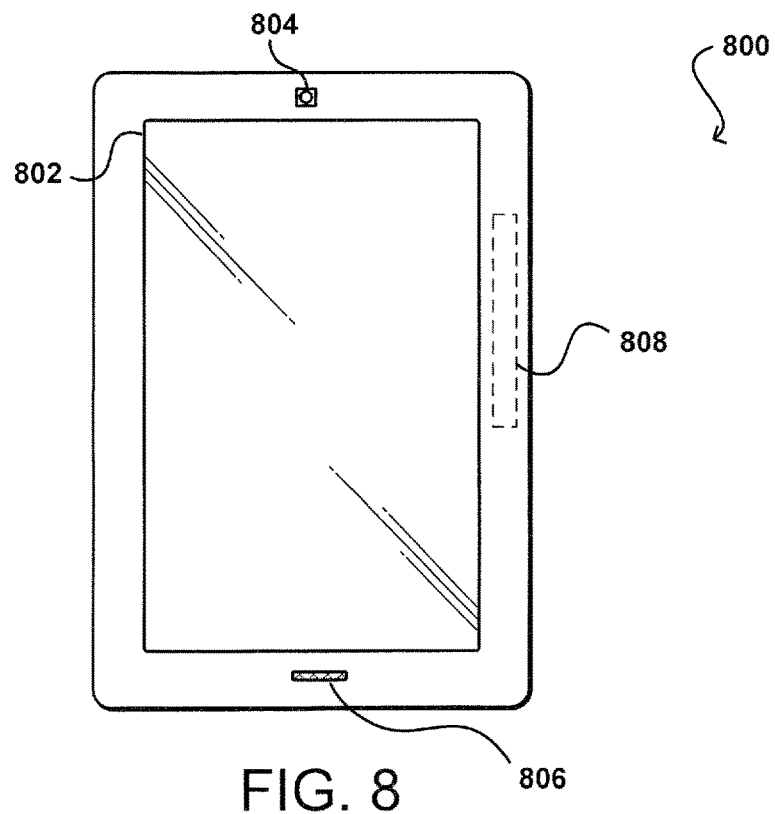
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 800 also includes at least one microphone 806 or other audio capture device capable of capturing audio data, such as words or commands spoken by a user of the device. In this example, a microphone 806 is placed on the same side of the device as the display screen 802, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 800 also can include at least one orientation sensor 808, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 9:
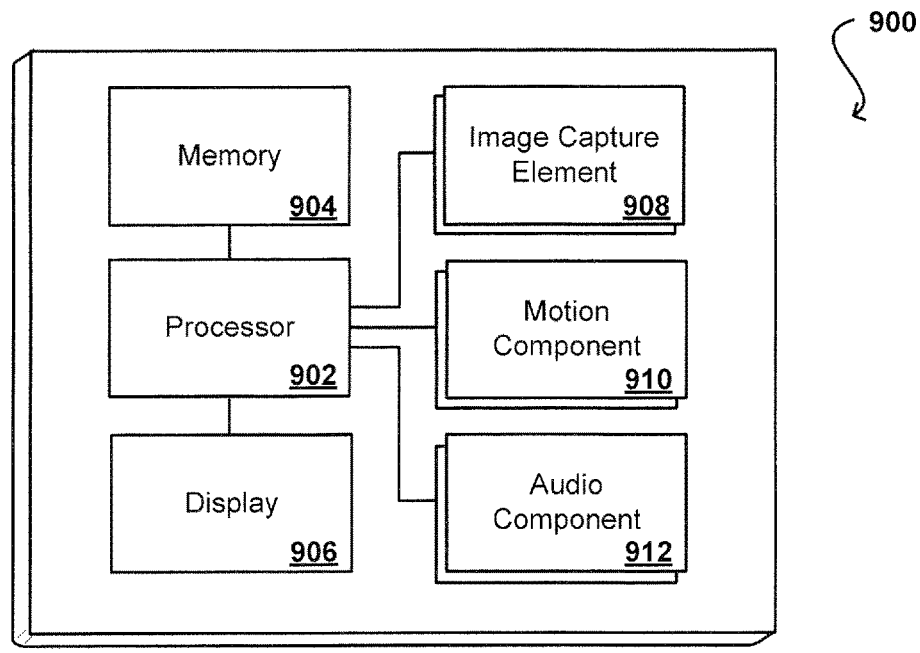
FIG. 9 illustrates example components of a client device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one image capture element 908 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 912, such as a mono or stereo microphone or microphone array, operable to capture audio information from at least one primary direction. A microphone can be a uni- or omnidirectional microphone as known for such devices.

In some embodiments, the computing device 900 of FIG. 9 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor 910. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as JAVA®, C, C# or C++, or any scripting language, such as Perl, Python, or TCL, as well as combinations thereof. The server(s) may also include database servers, including without limitation those commercially available from ORACLE®, MICROSOFT®, SYBASE®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing an alternate view of a product, comprising:
  receiving a first image captured using a camera of a portable computing device, the first image including a representation of a portion of a packaging of a product, the packaging at least partially obscuring a first view of the product;

analyzing the first image to identify a type of the product based at least in part upon matching the portion of the packaging;

determining one or more available views based on the type of product;

displaying a selectable option for a second view of the one or more available views;

receiving a selection of the selectable option;

receiving a second image that includes a representation of a second view of the type of the product, the second view based at least in part on the type of the product identified in the second image and including at least one internal view representing at least one of: the product as arranged within the packaging, an interior layer of the packaging, or one or more components of the product within the packaging;

scaling the second image based on the first image to create a scaled second image including a scaled second view of the type of product, the scaled second view corresponding to the representation of the packaging in the first image and further corresponding to an actual size of the product with respect to the packaging;

updating the second image to alter the second view of the type of product upon detecting a change in size or view angle of the representation of the packaging in the first image resulting from relative movement between the camera and the packaging;

overlaying the scaled second image on the first image; and displaying, on the portable computing device, the scaled second view representation of the type of the product over the representation of the packaging in the first image.

2. The computer-implemented method of claim 1, wherein matching the portion of the packaging includes locating matching information for an exterior portion of the packaging, a barcode contained on the packaging, or text contained on the packaging.

3. The computer-implemented method of claim 1, wherein the second view includes at least one of an image, a video file, an animation, a three-dimensional model, a stereoscopic image, or a multimedia file.

4. The computer-implemented method of claim 1, wherein the one or more available views includes at least one of: a view of one or more components of the product outside the packaging, a view of a finished version of the product, a view of a partially assembled version of the product, a three-dimensional view of the product, a moving view of the product, a view demonstrating how to use the product, or a view of one or more variations that are able to be created using the product.

5. The computer-implemented method of claim 1, wherein the second view includes an angle-appropriate view of the type of product appropriate for a current viewing angle of the camera with respect to the packaging.

6. The computer-implemented method of claim 1, wherein the first image includes one or more frames of video content captured by the camera.

7. A computer-implemented method, comprising:

obtaining first image information relating to a product using at least one camera of a computing device;

analyzing the first image information to determine an identity of the product inside of a packaging;

determining one or more available views based on the identity of product;

displaying a selectable option for a second view of the one or more available views;

receiving a selection of the selectable option;

receiving second image information that includes a representation of the product based at least in part on the product identified in the first image information, the second image information including a second view of the product differing in at least one aspect from a first view of the product included in the first image information, the second view including at least one internal view representing at least one of: the product as arranged within the packaging, an interior layer of the packaging, or one or more components of the product within the packaging;

scaling the second image information based on the first image information to create a scaled second image information including a scaled second view of the product such that the scaled second view of the product in the second image corresponds to a first view of the product in the first image and further corresponds to an actual size of the product with respect to the packaging;

updating the second image to alter the second view of the product upon detecting a change in size or view angle of the first view of the product in the first image resulting from relative movement between the at least one camera and the product;

overlaying the scaled second image information on the first image information; and displaying, on the computing device, the scaled second view of the product over the first view of the product represented in the first image information.

8. The computer-implemented method of claim 7, wherein the first view includes a representation of the product being at least partially contained in packaging, and wherein the second view includes a representation of the product outside the packaging.

9. The computer-implemented method of claim 7, wherein the product is capable of being transformed into a second state, and wherein the one or more available views includes at least one view of the product in the second state.

10. The computer-implemented method of claim 9, wherein the second state includes a state of assembled, full-grown, installed, or prepared, or a partial state thereof.

11. The computer-implemented method of claim 7, wherein the scaled second view is presented at least partially overlaying the first image information as displayed on a display element of a computing device.

12. The computer-implemented method of claim 7, wherein analyzing the first image information is performed at least in part using at least one of an image recognition algorithm, a feature recognition algorithm, a facial recognition algorithm, a video recognition algorithm, a shape recognition algorithm, a barcode detection algorithm, or an optical character recognition algorithm.

13. The computer-implemented method of claim 7, wherein multiple alternate views are provided, and wherein an interface presenting the multiple alternate views enables a user to selectively view at least a portion of the multiple alternate views.

14. The computer-implemented method of claim 7, wherein the second view includes at least one of an image, a video file, an animation, a three-dimensional model, a stereoscopic image, an enhanced view, an interactive view, or a multimedia file.

15. The computer-implemented method of claim 7, wherein the second view provides a different physical view of the product than is represented in the first image information.

16. The computer-implemented method of claim 7, wherein the second view includes a view of the product in packaging for the product when the first view of the product in the first image information is at least partially out of the packaging.

17. A computer-implemented method, comprising:
capturing video data using a camera of a computing device and displaying the video data on a display element of the computing device;
analyzing at least a portion of the video data showing a first view of a product to identify the product represented in the video data, the first view of the product being at least partially obscured by packaging;
determining one or more available views based on the identity of product;
displaying a selectable option for a second view of the one or more available views;
receiving a selection of the selectable option;
receiving an image that includes a representation of a second view of the product based at least in part on the product identified in the video data, the second view including at least one internal view representing at least one of: the product as arranged within the packaging, an interior layer of the packaging, or one or more components of the product within the packaging;
scaling the image such that the second view of the product corresponds to the first view of the product in the video data and further corresponds to an actual size of the product with respect to the packaging to create a scaled image including a scaled second view;
updating the image to alter the second view of the product upon detecting a change in size or view angle of the first view of the product resulting from relative movement between the camera and the product;
overlaying the scaled image on the portion of the video data; and
displaying, on the computing device, the scaled second view of the product over the packaging in the first view shown in the video data.

18. The computer-implemented method of claim 17, wherein a size of the second view is rescaled with changes in a relative size of the packaging in the video data resulting from movement of at least one of the packaging or the computing device.

19. The computer-implemented method of claim 17, wherein the second view is selected from a plurality of views of the product, and wherein a different image representation is capable of being displayed with changes in viewing angle of the camera with respect to the packaging.

20. The computer-implemented method of claim 19, wherein different interactive elements are capable of being displayed with changes in the viewing angle of the camera with respect to the packaging.

21. A computing device, comprising:
a processor;
a camera;
a display element; and
a memory device including instructions that, when executed by the processor, cause the computing device to:
capture video data of a product using the camera;
display at least a portion of the video data on the display element, the video data including a first view of at least a portion of a packaging at least partially obscuring a product;
cause at least a portion of the video data to be analyzed to determine an identity of the product;
determine one or more available views based on the identity of product;
display a selectable option for a second view of the one or more available views;
receive a selection of the selectable option;
receive an image that includes a representation of a second view of the product based at least in part on the packaging of the product identified in the video data, the second view differing in at least one aspect from the first view of the packaging of the product displayed on the display element, the second view including at least one internal view representing at least one of: the product as arranged within the packaging, an interior layer of the packaging, or one or more components of the product within the packaging;
scale the image such that the second view of the product corresponds to the first view of the product in the video data and further corresponds to an actual size of the product with respect to the packaging to create a scaled image including a scaled second view;
update the image to alter the second view of the product upon detecting a change in size or view angle of the first view of the product resulting from relative movement between the camera and the product; and
overlay the scaled image on the portion of the video data such that the scaled second view of the product is displayed on the display element over the packaging in the first view of the product.

22. The computing device of claim 21, wherein the one or more available views includes multiple alternate views, the multiple alternate views being ranked according to one or more ranking algorithms, and
wherein the computing device is configured to enable scrolling through the multiple alternate views according to a ranking order of the multiple alternate views.

23. The computing device of claim 21, wherein the second view is obtained from a third party source.

24. A non-transitory computer-readable storage medium including instructions that, when executed by at least one processor of a computing device, cause the computing device to:
obtain, using a camera of the computing device, first image information relating to a product inside a packaging;
analyze the first image information to determine an identity of the product;
determine one or more available views based on the identity of product;
display a selectable option for a second view of the one or more available views;
receive a selection of the selectable option;
receive second image information that includes a representation of the product without the packaging based at least in part on the product identified in the image information, the second image information including a second view of the product differing in at least one aspect from a first view of the product included in the first image information, the second view including at least one internal view representing at least one of: the product as arranged within the packaging, an interior layer of the packaging, or one or more components of the product within the packaging;

scale the second image information such that the second view of the product corresponds to first view of the product in the first image information and further corresponds to an actual size of the product with respect to the packaging to create a scaled second image information and a scaled second view;

update the second image information to alter the second view of the product upon detecting a change in size or view angle of the first view of the product resulting from relative movement between the camera and the product; and display, on the computing device, the scaled second image information overlayed on the first image information such that the second view of the product without the packaging is displayed over the first view of the product represented in the first image information.

25. The non-transitory computer-readable storage medium of claim 24, wherein the second image information is provided as a service to at least one separate entity.

26. The non-transitory computer-readable storage medium of claim 24, wherein the second view includes at least one of an image, a video file, an animation, a three-dimensional model, a stereoscopic image, or a multimedia file.

27. The non-transitory computer-readable storage medium of claim 24, wherein the second view includes an angle-appropriate view of the product appropriate for a current viewing angle of a camera with respect to packaging of the product, and wherein the instructions when executed further cause the computing device to:

adjust a scale of the angle-appropriate view of the product based at least in part upon a relative size of the packaging in the first image, the first image being displayed on the computing device.

* * * * *